United States Patent
Crapart

[19]

[11] Patent Number: 5,944,360
[45] Date of Patent: Aug. 31, 1999

[54] DEVICE FOR MAKING A SEALED CONNECTION BETWEEN CHANNELS

[75] Inventor: René Crapart, Ste Gennes d'Andigne, France

[73] Assignee: Hutchinson, Paris, France

[21] Appl. No.: 09/027,431

[22] Filed: Feb. 20, 1998

[30] Foreign Application Priority Data

Feb. 20, 1997 [FR] France ................................... 97 02014

[51] Int. Cl.[6] ...................................................... F16L 9/14
[52] U.S. Cl. ..................... 285/55; 285/124.2; 285/124.3; 285/906
[58] Field of Search .............................. 285/124.1, 124.2, 285/124.5, 124.4, 55, 124.3, 906; 277/598, 600

[56] References Cited

U.S. PATENT DOCUMENTS

| | | | |
|---|---|---|---|
| 2,395,243 | 2/1946 | Aukers | 277/598 |
| 3,338,598 | 8/1967 | Kurtz | 285/55 |
| 3,453,007 | 7/1969 | Roland | 285/124.4 |
| 3,570,374 | 3/1971 | Stratton | 92/171 |
| 3,722,924 | 3/1973 | Bjornsen | 285/55 |

OTHER PUBLICATIONS

French Preliminary Search Report dated Nov. 12, 1997, French Application FR 9702014 filed Feb. 20, 1997.

*Primary Examiner*—Dave W. Arola
*Attorney, Agent, or Firm*—Marshall, O'Toole, Gerstein, Murray & Borun

[57] ABSTRACT

A device for making a sealed connection between channels which are made respectively in two components which bear on each other via at least one spacer. This device is in the form of a tubular insert 8 comprising a rigid tubular armature 9 having a length slightly less than the thickness of the spacer in the region of the channels; and at least one tube 10, made of rubber or elastic synthetic material, lining at least the ends of the armature 9 and having at both its ends a rim 11, 12 covering the corresponding end of the armature, this rim being able to be compressed, upon fitting the insert, in a sealed manner between each end of the tubular armature 9 and the corresponding component.

10 Claims, 3 Drawing Sheets

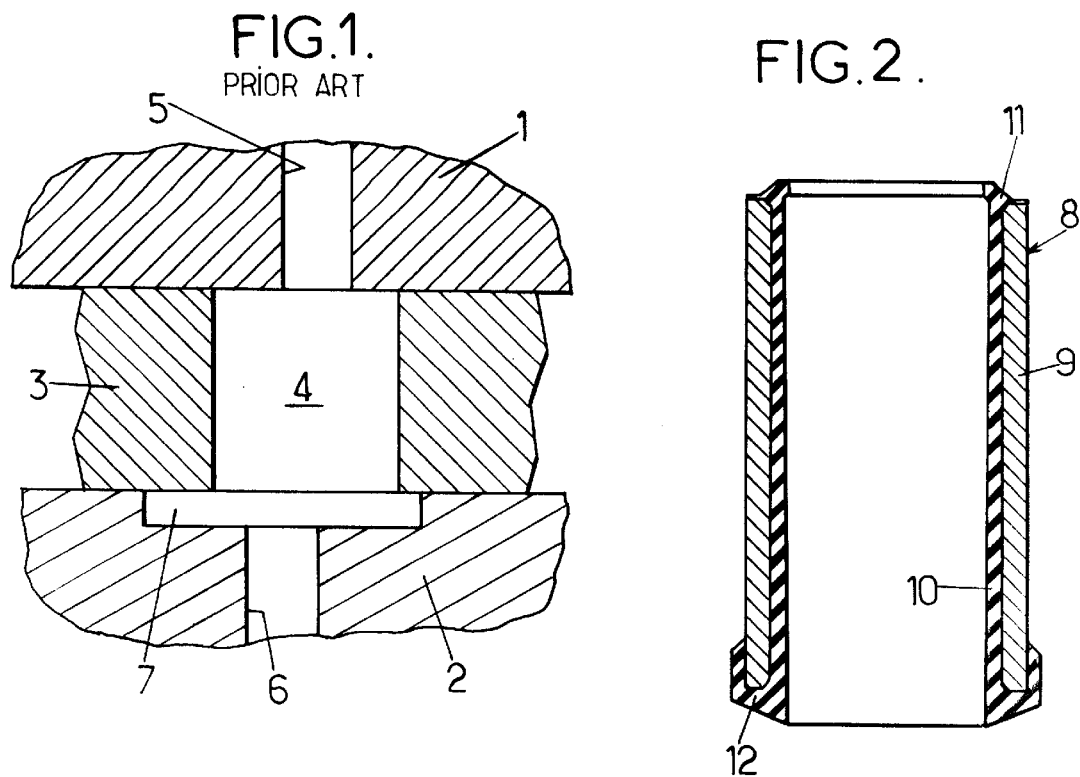
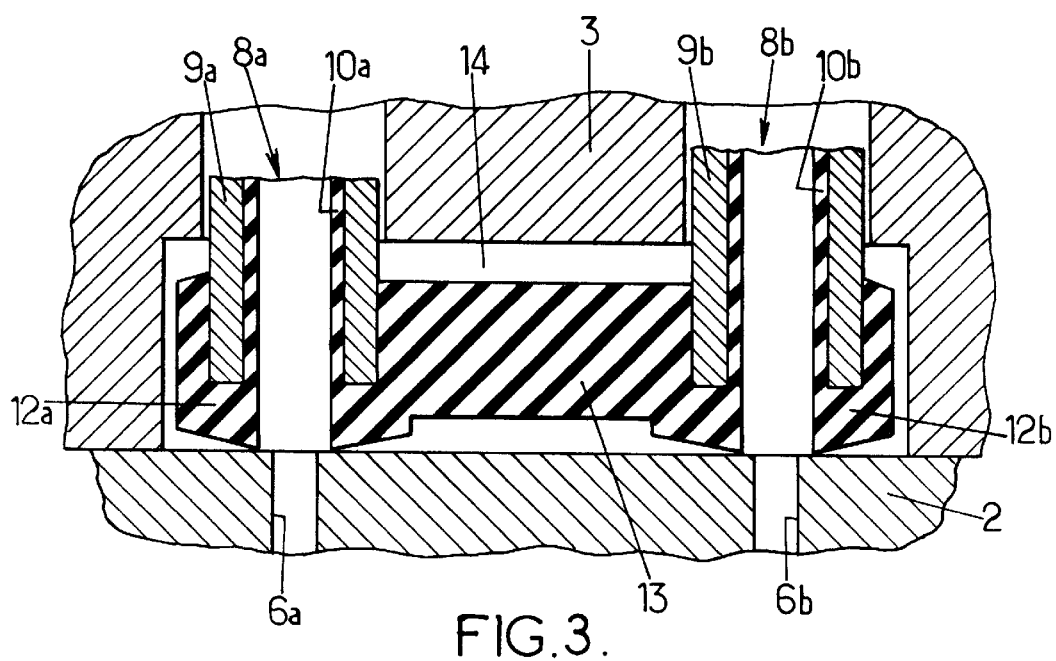

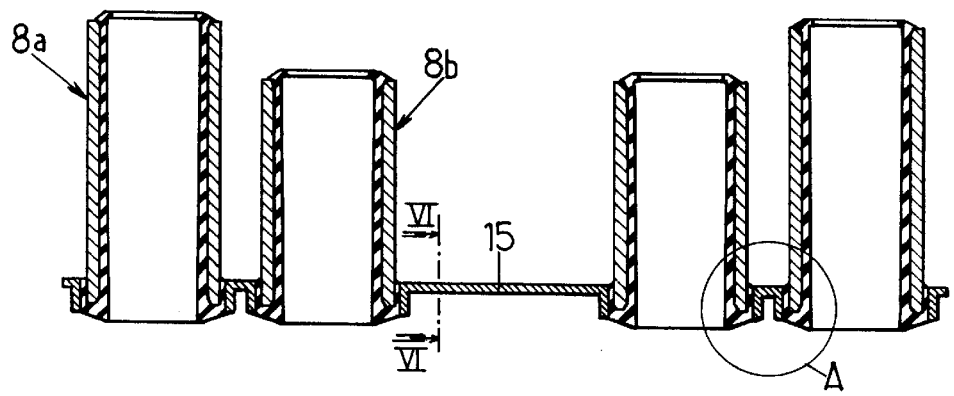
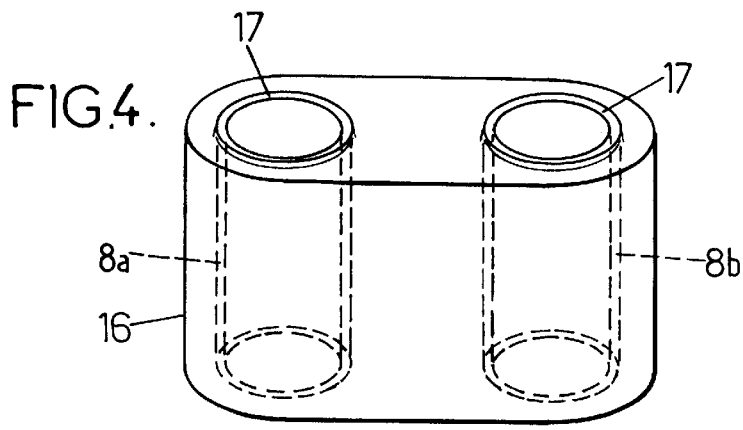
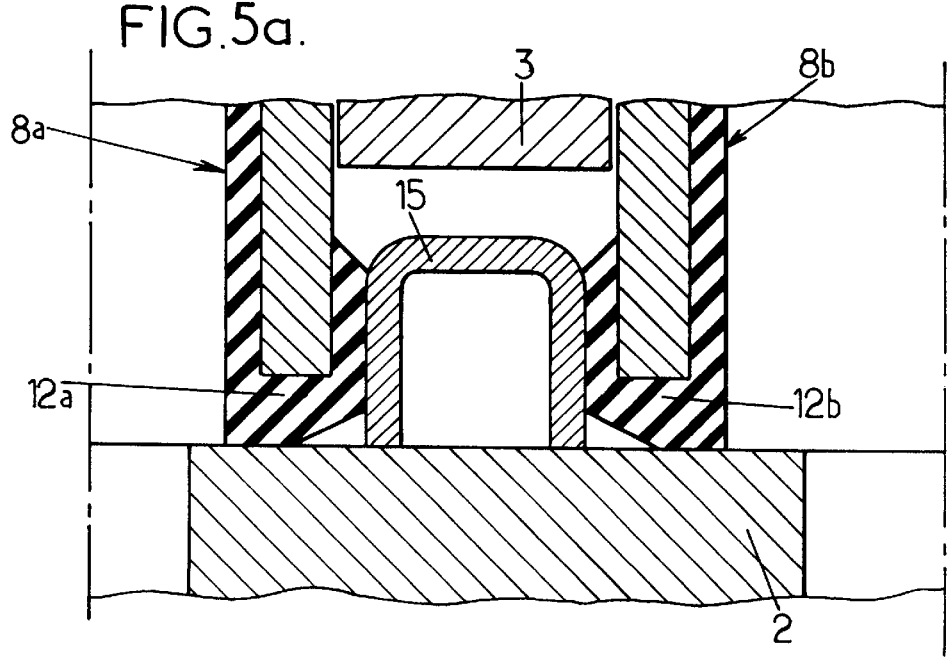

DEVICE FOR MAKING A SEALED CONNECTION BETWEEN CHANNELS

The present invention relates to a device for making a sealed connection between channels which are made respectively in two components which bear on each other via at least one spacer, passing through this spacer being at least one bore having a diameter greater than that of the channels and suitable for bringing a channel in one of the components into communication with a channel in the other component, the second channel being aligned with the first or slightly offset with respect to it, and this device comprising at least one tubular insert lodged in each spacer bore and a rigid tubular armature having a length slightly less than the thickness of the spacer in the region of the bore in question.

By virtue of this device, continuity may be provided, for example, between channels for flow of a fluid in two components separated by spacers. In practice, this fluid can be oil circulating at a pressure which can vary, possibly in a pulsatory manner, from 0 to several tens of bar, at a temperature which can also vary greatly (for example, from −40 to +150° C.), the components in question possibly forming part of casings in an automatic gearbox.

FIG. 1 of the drawings appended hereto diagrammatically represents such a device, in crosssection through the axis of the channels. In this figure, two components bearing on each other via a spacer 3 have been given the reference numbers 1 and 2. Passing through this spacer is at least one bore 4 having a diameter greater than that of the channels 5 and 6 which are made respectively in the components 1 and 2, which bore has the function of connecting these channels to each other in a sealed manner. As shown, the channels 5 and 6 are slightly offset with respect to each other and with respect to the axis of the bore 4. There may also be, as is found in practice, a large variation in the thicknesses of the spacer 3, as well as variable clearances between it and the components 1 and/or 2. This prevents the use of the conventional means, which would consist in sealing by means of flat seals clamped between, on the one hand, the spacer 3 and, on the other hand, the components 1 and 2.

It may therefore be conceivable to seal by means of tubular inserts, for example made of rubber, which are axially compressed between the components 1 and 2. However, if such an insert cannot be held in place from the outside over its entire height by the bore 4 in the spacer 3, there is a risk of it deforming and even bursting due to the pressure of the fluid which, as was noted above, may be high and furthermore may vary in a pulsatory manner; this situation may arise in particular when one of the channels, for example the channel 6, runs into a counter bore 7 in the corresponding component 2 (see U.S. Pat. No. 3,570,374) or when there is a space between the components 1 and 2 and the spacer 3. Even a simple deformation may make it impossible to remove such tubular inserts and may be the cause of a leak.

The object of the present invention is to solve this problem and, for this purpose, a device for making a sealed connection according to the invention, of the type defined at the beginning, is characterized in that it comprises at least one tube, made of rubber or elastic synthetic material, lining at least the ends of the said armature and having at both its ends a rim covering the corresponding end of this armature, this rim thus being able to be compressed, upon fitting the insert, in a sealed manner between each end of the tubular armature and the corresponding component.

It may therefore be understood that the external or internal rigid tubular armature of the insert will prevent any substantial deformation, in particular expansion, of the internal or external rubber tube sealing the bore. As regards the ends of this armature, these will serve as bearing surfaces for the tube's end rims which are compressed between the two components and the spacer thereby maintaining a seal at the ends of the connection insert.

The tubular armature may advantageously be made of metal and produced in a solid form or, if it is not to be subjected to axial compressive forces, in the form of a braid of metal wires or mineral or synthetic fibres.

In many cases, there will be several flow passages and this will require the use of several tubular inserts. It is advantageous to connect these inserts together in order to make it simpler to fit them and prevent any errors in positioning them, especially when the spacers have to be of different lengths.

For this purpose, a device according to the invention may also be characterized in that it includes a certain number of tubular inserts connected together by bands, which will then advantageously be made of rubber or of elastic synthetic material and moulded in one piece with the internal or external tube of the said inserts.

According to another variant, the inserts may be embedded in a block of rubber or synthetic material, their ends constituting rims extending beyond the corresponding outermost surface of the said block.

According to another embodiment of the invention, the device may also be characterized in that it includes a certain number of tubular inserts connected together by a perforated connection plate.

This connection plate, for example made of metal or rigid plastic, may constitute a removable dispenser, which is disposable or recoverable, or, as a variant, it may constitute an integral element intended to remain permanently lodged in the said spacer. This arrangement will have the advantages mentioned later.

Other arrangements of the invention will emerge from reading the description of several embodiments given by way of entirely non-limiting examples, with reference to the other figures of the appended drawing in which:

FIG. 1 is a partial sectional view of a prior art device.

FIG. 2 is an axial sectional view of a tubular insert according to the invention;

FIG. 3 is a partial axial sectional view of the lower part of two inserts according to the invention, these being connected by a band;

FIG. 4 shows, in perspective, two inserts embedded in a connection block;

FIG. 5 is an axial sectional view of several inserts connected together by a connection plate;

FIG. 5a is a partial axial sectional view showing the detail A in FIG. 5;

Figure 6:
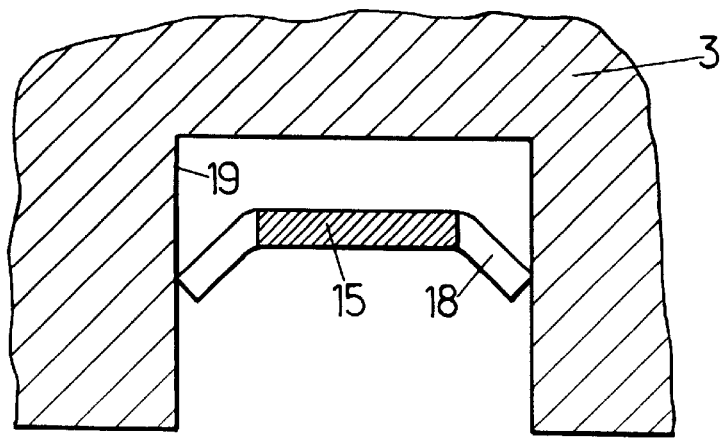
FIG. 6 is a partial axial sectional detailed view of a connection plate along the line VI—VI in FIG. 5, showing one way of fastening this plate to the spacers.

FIG. 2 shows, given the general reference number 8, a tubular insert consisting of an external rigid tubular armature 9 and a tube 10 made of synthetic material. This tube has a circular rim 11, 12 at its ends. Thus, after fitting the insert 8 into the bore 4, these rims are compressed respectively between the components 1 and 2 and the corresponding end of the external armature 9 when the spacer 3 is clamped between these two components.

FIG. 3 shows one possible connection between two tubular inserts 8a and 8b by a band 13 of synthetic material moulded as one piece with the tubes 10a and 10b of synthetic material which internally line the rigid armatures 9a and 9b. Moreover, this figure clearly shows the sealing function of the rims 12a and 12b which are compressed, after fitting, between the component 2 and the lower ends of the armatures 9a and 9b, around the orifices of the oil circulation channels 6a and 6b of the component 2. In order to house the bands 13, it is merely necessary to provide grooves, such as 14, at the ends of the spacer 3.

FIG. 4 shows the variant mentioned earlier, in which the inserts 8a, 8b are embedded in a block of rubber or of synthetic material, given the reference number 16. Indicated at 17 are rims which extend beyond the outermost faces of the block 16 and have the same function as the aforementioned rims 11 and 12.

The embodiment in FIG. 5 shows one way of fastening the various inserts 8a, 8b, etc. together, by means of a perforated connection plate 15 made of metal or of flexible or rigid plastic. Optionally, this plate could serve as a removable dispenser, which could be thrown away after fitting or recoverable, but it will be advantageous to make it in the form of an element integral with the spacer 3, intended to remain permanently there after fitting. This then has the advantage that when the inserts, and therefore the rims such as 12a and 12b are axially compressed (see the detail in FIG. 5a), the plate 15 is pushed back by the component 2 and slides along the inserts, thereby holding these rims perfectly in place. This also eliminates any risk of the rims being extruded because of the contact between the component 2 and the connection plate 15 (the same applies to the upper end of the spacers).

In the case of an arrangement in which the components move vertically, it may happen that removing the lower component 2 allows the tubular inserts to fall. To avoid this risk, it is possible, as shown in FIG. 6, to use clasps 18 on the connection plate 15 which are suitable for gripping, by deforming elastically, against the side walls of the housings 19 made in the spacer 3.

Figure 7:
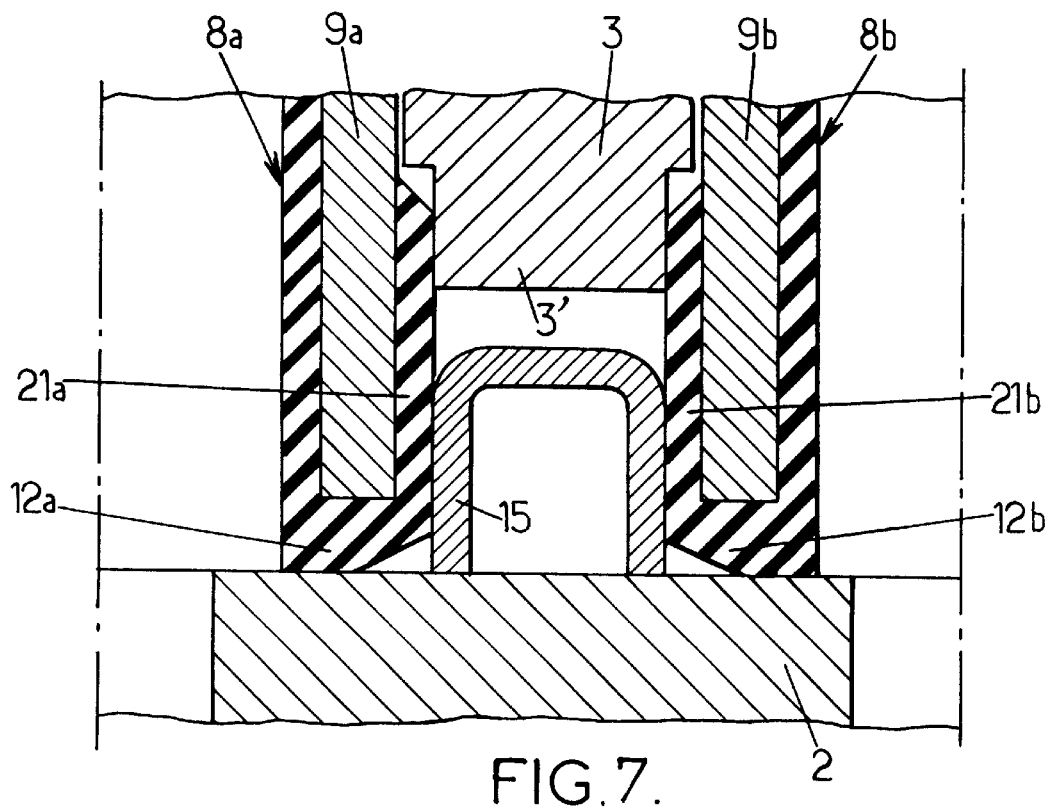
FIG. 7 is another partial axial sectional detailed view showing one way of wedging the lower end of the inserts against the spacer.

By way of a variant, it is also possible to use the solution illustrated in FIG. 7. In this case, the lower rims 12a and 12b are extended on the outside of the lower ends of the tubular armatures 9a and 9b in order to form wedging cushions 21a, 21b between these armatures and a suitable projection 3' of the spacer 3, these cushions also being able to exert a clamping force on the connection plate 15.

Thus, any risk of the inserts 8a, 8b, etc. falling when extracting the component 2 is eliminated.

The illustrative embodiments all show the use of an external tubular armature 9 and a single internal rubber tube 10 extending from one end of the armature 9 to the other. However, it would be possible to place the rubber tube 10 on the outside of the armature, for ease of realization. Likewise, it would be conceivable to omit the central part of the tube 10. The tube 10 would then consist of two outermost sections lining only the ends of the tubular armature 9.

I claim:

1. A device for making a sealed connection between channels which are made respectively in two components which bear on each other via at least one spacer, passing through this spacer being at least one bore having a diameter greater than that of the channels and adapted to bring a channel in one of the components into communication with a channel in the other component, each component having a sealing surface surrounding the channels, the device comprising at least one tubular insert disposed in each spacer bore, wherein the tubular insert comprises a rigid tubular armature having a length slightly less than the thickness of the spacer, and wherein the tubular insert comprises at least one elastomeric tube, lining at least the ends of the said armature and having at both its ends a rim covering the corresponding end of this armature, this rim thus being able to be axially compressed, in a sealed manner between each corresponding component to form a circumferentially sealed interface between the ends of the insert and the sealing surfaces of the components.

2. The device according to claim 1, wherein said armature is made of a braid of fibers.

3. The device according to claims 1 or 2, comprising a plurality of tubular inserts connected together by bands, wherein the bands are made of rubber or elastic synthetic material and are integrally molded with the elastomeric tube of the inserts.

4. The device according to claims 1 or 2, wherein said inserts are embedded in a block of rubber or synthetic material, their ends constituting said rims extending beyond the corresponding outermost surface of said block.

5. The device according to claims 1 or 2, further comprising a plurality of tubular inserts connected together by a perforated connection plate, wherein the connection plate is removable from the inserts.

6. The device according to claims 1 or 2, further comprising a plurality of tubular inserts connected together by a perforated connection plate, wherein said connection plate is an integral element that is not removable from the inserts.

7. The device according to claim 6, wherein said connection plate comprises clasps that retain the inserts in the spacer, by deforming elastically, against the side walls of recesses made in the spacer.

8. A device according to claim 6, wherein said rims are circumferentially extended outside the ends of the tubular armatures by wedging cushions suitable for being wedged between the armatures and the spacer.

9. The device according to claim 1, wherein said elastomeric tube lines said armature internally.

10. The device according to claim 1, wherein said elastomeric tube portion is continuous from one end of the armature to the other.

\* \* \* \* \*